Feb. 19, 1924.
N. Y. TROIDL
1,483,916
EDUCATIONAL APPLIANCE
Filed Oct. 25, 1922
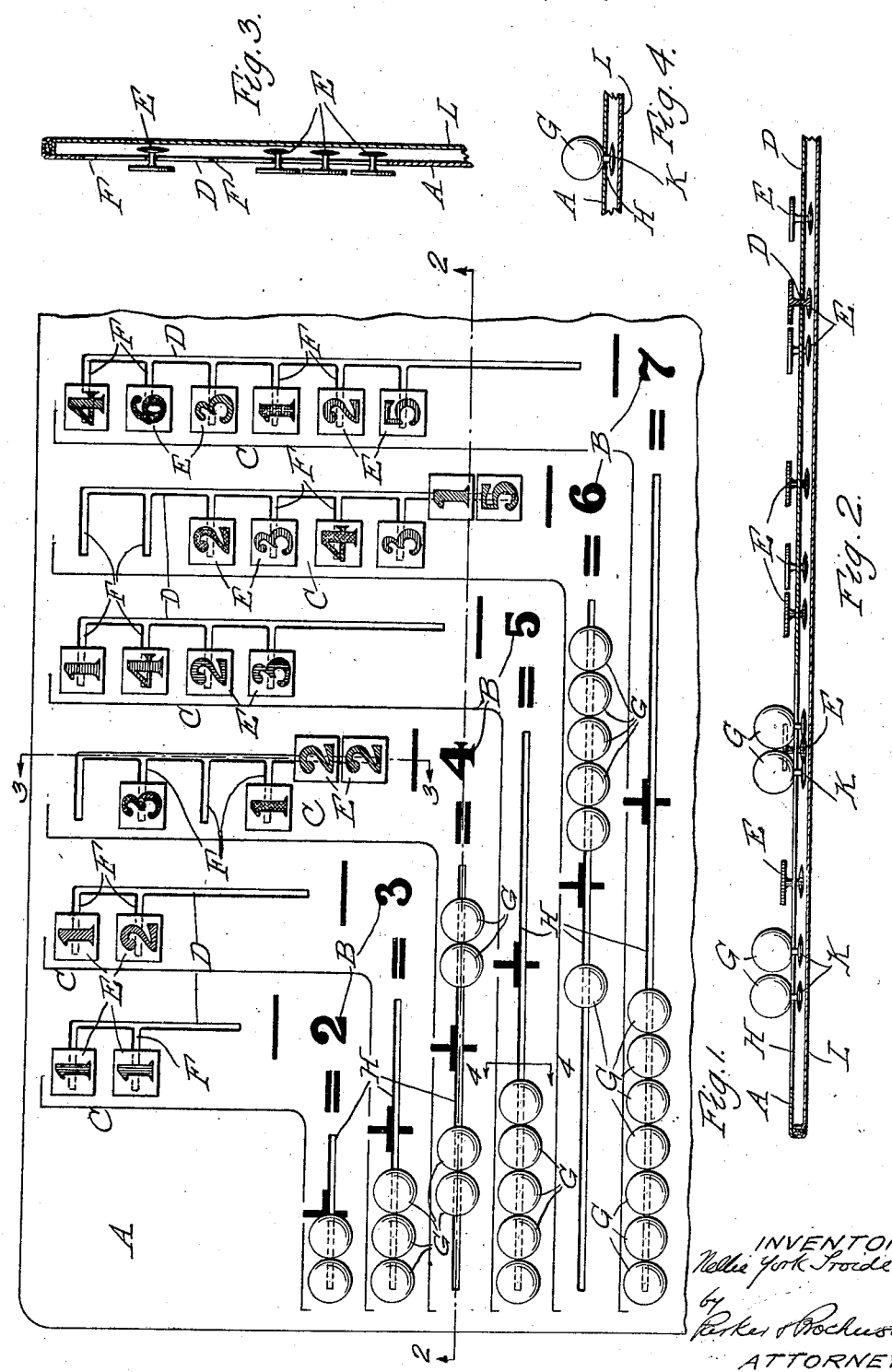
INVENTOR.
Nellie York Troidl
by
Parker & Rochusal.
ATTORNEYS Patented Feb. 19, 1924.

1,483,916

UNITED STATES PATENT OFFICE.

NELLIE YORK TROIDL, OF NIAGARA FALLS, NEW YORK.

EDUCATIONAL APPLIANCE.

Application filed October 25, 1922. Serial No. 596,866.

*To all whom it may concern:*

Be it known that I, NELLIE Y. TROIDL, a citizen of the United States, residing at Niagara Falls, in the county of Niagara and State of New York, have invented a new and useful Improvement in Educational Appliances, of which the following is a specification.

This invention relates to appliances for facilitating the teaching of number work or the like.

The objects of the invention are to provide a device which permits the child's instinctive association of like-appearing objects to be utilized to teach the values of numbers; also to provide a device by means of which while the child is being instructed in the arithmetical values of numbers, it is also taught the true or concrete values of such numbers by reference to a number of objects; also to provide a device having means for presenting a plurality of problems and answers in number work and means by which the child may verify or check the problems and answers as they are produced. Further objects are to provide improvements in educational appliances and devices in the other respects hereinafter set forth and claimed.

In the accompanying drawings:

Fig. 1 is a front elevation of a portion of the device, illustrating the invention.

Fig. 2 is a section thereof on line 2—2, Fig. 1.

Fig. 3 is a section thereof on line 3—3, Fig. 1.

Fig. 4 is a section on line 4—4, Fig. 1.

The invention comprises a device adapted to present and illustrate a desired number of problems in number work or the like having means for displaying a numeral or a series of numerals and means for associating therewith a plurality of numerals representing component parts of the number expressed by the first-named numerals. The invention preferably includes also means such as the provision of concrete objects or the like to be counted or checked, whereby the values of the numerals displayed may be readily understood and appreciated and is also concerned with providing certain of the numerals with a similar appearance or with like indicating means so that the child may be assisted in the working of the problems by matching or grouping together numerals of like appearance, or members having like indicating means.

The numerals to be worked with are preferably mounted on a suitable support, in the embodiment illustrated there is provided a board A having displayed thereon a series of numerals B. In the form illustrated this series is the arithmetical series 2, 3, 4, 5, 6 and 7, but any desired numbers may be used and they may be arranged in any suitable manner and it is not necessary that they constitute a strictly arithmetical series. C designates sets of numeral members, each set being arranged to cooperate with one of the numerals of the series, and the numerals of the set being such that certain of them represent component parts of the number represented by the series numeral with which their respective sets cooperate. For example, in the first set at the left hand side of Fig. 1, there are represented those numbers whose sum equals the number represented by the series numeral with which that set cooperates, namely 2. Proceeding to the right, the next set represents the numbers 1 and 2, the sum of which is 3, as shown on the series numeral co-operating with that set. For series numerals of higher value, there are provided, preferably, any desired numbers which when added together give the sum represented by the series numeral; for example, at the right of Fig. 1, numbers are represented which when added together make the sum of 7, that being the number represented by the series numeral for that set, and in the set for the series number 7 are shown the numerals 4 and 3, 6 and 1, and 2 and 5. The numerals constituting the sets are preferably so mounted that the representations of the numbers which when added together give the sum represented by the series numeral for that set, may be readily grouped together and preferably in a position adjacent the series numeral. It is also desirable that the numeral members be attached to the device so that while they may be readily manipulated, they cannot be removed from the device and will not become misplaced or lost. With this purpose in view, the device illustrated includes the provision of slots D in the board, the numerals of the sets being mounted on suitable numeral members such as buttons E. These buttons have shanks extending through the slots and the opposite heads of the buttons prevent removal of these numeral bearing members from the board, at the same time permitting them to be readily moved in the slots. The slots D preferably communicate with a plurality of laterally formed slots F providing places where the numeral bearing members may rest when they are not being used and allowing free passage of any one of the numeral bearing members in slot D without interference by the other numeral bearing members.

In order to assist in the working of the problems, those numeral members of the sets which when grouped together cooperate with the series numeral for that set, are provided with similar appearances or have similar indications so that they may be readily taken out of the set and moved to their positions adjacent the series numeral by the process of matching appearances or indications. Thus, for example, for the series numeral 7 at the right of Fig. 1, the numeral members of the set bearing the numerals 2 and 5 have those numerals displayed in a like color, namely blue. The numerals 4 and 3 are purple and the numerals 6 and 1 are yellow. This renders it possible for the child to associate or group together representations of those numbers whose sum is equal to the series number displayed for that problem before he has learned the sum value of those particular members. By so grouping the members of the set together, the sum of the numbers represented by those numerals, that is the series number, is before the child and he is apprised as to what component numbers are presented in that sum.

For the purpose of impressing upon the pupil the concrete value of the sums or of the numerals displayed, the device is preferably equipped with a plurality of objects or counters which may be handled and counted by the pupil so that, having produced or worked any one of the problems possible to produce on the device, he may verify that working or gain an understanding of the concrete value of the numbers presented in the problem by working the problem with a plurality of objects. In the embodiment of the invention shown, the device is provided with sets of movable objects or counters G, each set being in a position to cooperate with one of the series numerals and to be readily associated with that series numeral and with the set numerals cooperating therewith. In the device shown in the drawings, there are provided in the sets for each of the series numerals, a plurality of movable objects equal in number to the number represented by the series numeral. For example, to cooperate with the series numeral 7, there are provided seven movable objects. These objects are preferably mounted so as to be readily moved and in such a manner that they may be readily divided to present groups consisting of the same number of objects as represented by the numerals grouped together from the numeral sets which make the sum of the number represented by the series numeral for that set. With this purpose in mind, as shown, the movable objects may be mounted on suitable guides, slots H being shown for that purpose, and the sign for the particular arithmetical operation to be carried out on the device may be displayed at some point on the guide. In Fig. 1, between the ends of the slots H addition signs are displayed on the board. Therefore, in working problems in addition on the board illustrated, in working toward the sum 4, as shown, the objects may be placed in relation to the sign of the operation in such manner that they correspond with the numeral members used in the problem. As illustrated for the series numeral 4, the numeral members grouped together each display the numeral 2, therefore, in working out this problem with the concrete objects, two of the objects are placed in position on each side of the addition sign. It is obvious if the numerals 3 and 1 are used that three of the objects are placed in position on one side of the addition sign, and one on the other. The movable objects are preferably of a form readily adapted to be grasped by the hand of the pupil and, as shown, may be provided with shanks extending through the slots in the board and heads K for the shanks which retain the objects in position on the board.

The board A may be provided with a back L preferably spaced from the board so as to cover the backs of the buttons or movable objects and to permit them to be moved freely on the board.

The device of the invention is easy to operate and provides a ready method for teaching addition or other forms of number work, as a pupil having no knowledge of the values of numbers may readily associate numerals of proper value together by grouping them according to their appearance or color. In addition the pupil is given a tangible realization of the value of the numbers and of the sums by handling and counting the objects.

I claim as my invention:

1. In an educational appliance, the combination of a support having a series of numerals displayed thereon, a plurality of sets of numeral-displaying members movable on said support to and from positions adjacent the numerals of said series, the sets of members being arranged to cooperate with different series numerals, each of the members of a set having a similar appearance to another member of the same set, whereby members of similar appearance in a set may be readily grouped adjacent the series numeral for that set, said series numerals representing numbers bearing a predetermined arithmetical relation to the numbers represented on similarly appearing members of the sets with which they cooperate, and a plurality of objects movably mounted to cooperate with said series numerals and adapted to be arranged to bear a predetermined numerical relation to the numbers represented by said sets and said series numerals.

2. In an educational appliance, the combination of means for displaying a series of numerals, a plurality of guides on said displaying means, each guide cooperating with one of said numerals of said series, a set of separate numeral-bearing members on each of said guides, the numeral-bearing members of each set representing numbers that are component parts of the number represented by the series numeral for that set, the group of members in each set representing numbers which when added together equal the sum represented by the series numeral for that set being of like colors, and a set of movably mounted objects for cooperating with each series numeral, each set comprising a number of objects equal to the number represented by the series numeral for that set, whereby said objects may be grouped to present in object form the equivalent of the problem formed by grouping the numeral bearing members.

3. In an educational appliance, the combination of a support, a plurality of numerals displayed on said support, and a set of counters for each numeral displayed on said support, said counters being movably attached to said support, each set consisting of a plurality of counters equal in number to the numeral cooperating with that set and being disposed in alinement with said cooperating numeral, whereby the counters of a set may be divided into groups, the counters comprising each group representing numbers which are component parts of the numeral for that set.

4. In an educational appliance, the combination of a support, a series of numerals displayed on said support, a set of counters for each numeral displayed on said support, said counters being movably attached to said support, and each set consisting of a plurality of counters equal in number to the numeral cooperating with that set, whereby the counters of each set may be arranged into groups each equal in number to component parts of the numeral for that set, and a set of movable numeral-bearing members cooperating with each numeral of said series, said numeral-bearing members displaying numerals representing component parts of the number represented by the series numeral for said set, each set of counters and each set of numeral bearing members being disposed immediately adjacent to their common related numeral.

5. In an educational appliance, the combination of a support having displayed thereon a numeral representing the sum of a plurality of numbers, a pair of guides on said support in cooperative relation to said numeral, a plurality of members mounted to move on one of said guides, said members bearing representations of numbers having a predetermined arithmetical relation to the number represented by said numeral, and a plurality of objects movably mounted on another of said guides.

6. In an educational appliance, the combination of a board arranged to display representations of a plurality of numbers, a plurality of movably mounted objects on said board and arranged in sets of the same number as indicated by each representation to cooperate with said representation, and a plurality of movable members arranged in sets to cooperate with each of said representations and its objects, said movable members displaying representations of numbers that are component parts of the numbers indicated by said representations, each set of objects and each set of movable members being disposed in alinement with their cooperating representation.

NELLIE YORK TROIDL.